Nov. 26, 1957    R. G. STREUBER    2,814,763
SWITCH AND SYSTEMS FOR UTILIZING THE SAME
Filed May 18, 1951    4 Sheets-Sheet 4
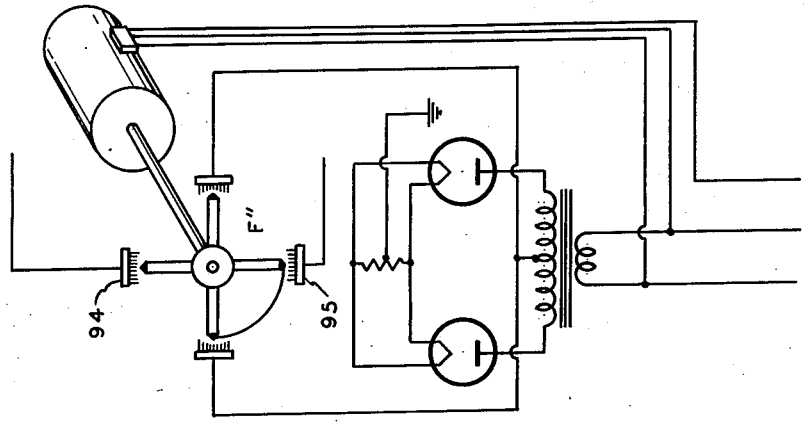
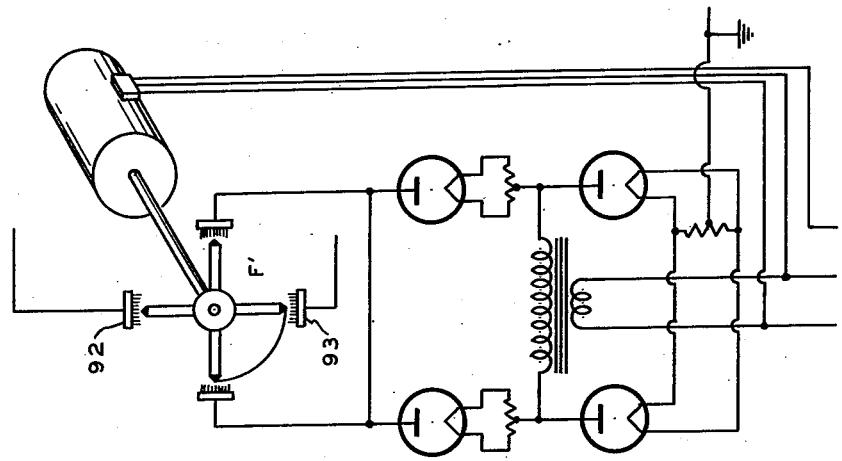
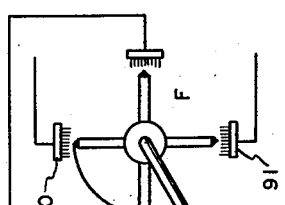
INVENTOR
RUDOLF G. STREUBER
BY
*Stowell & Evans*
ATTORNEYS United States Patent Office 2,814,763
Patented Nov. 26, 1957

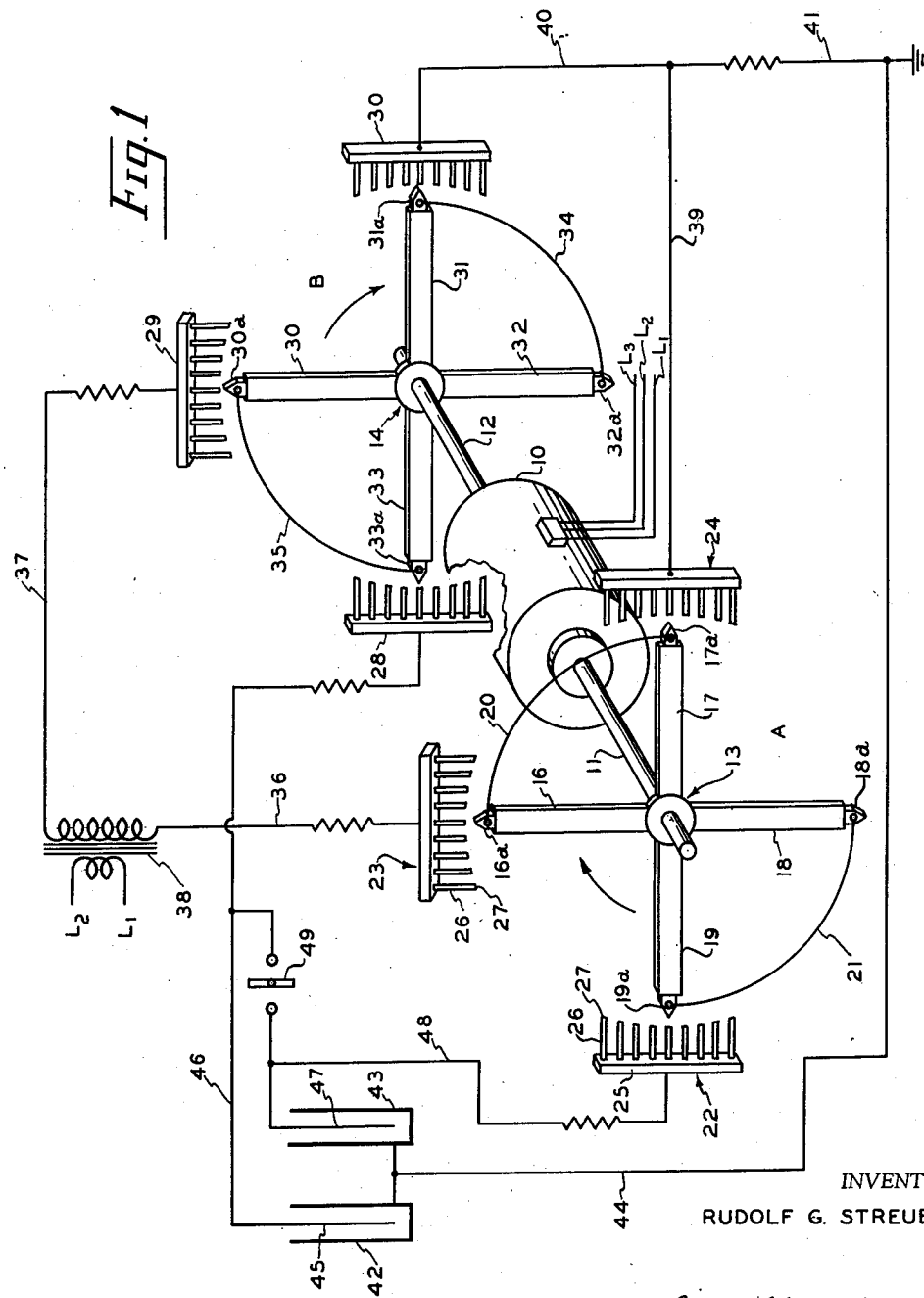
Nov. 26, 1957  R. G. STREUBER  2,814,763
SWITCH AND SYSTEMS FOR UTILIZING THE SAME
Filed May 18, 1951  4 Sheets-Sheet 1
INVENTOR
RUDOLF G. STREUBER
BY Stowell & Evans
ATTORNEYS

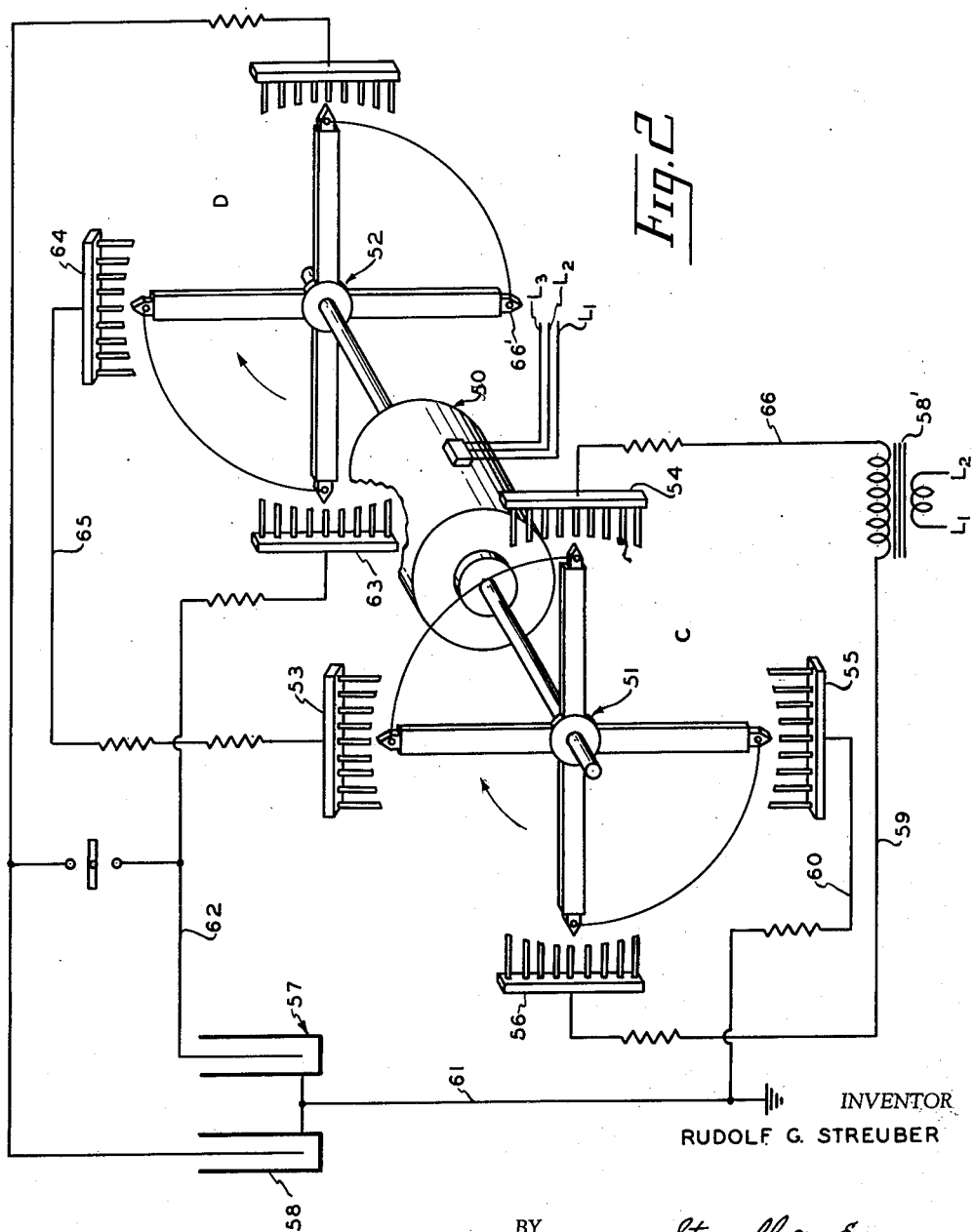

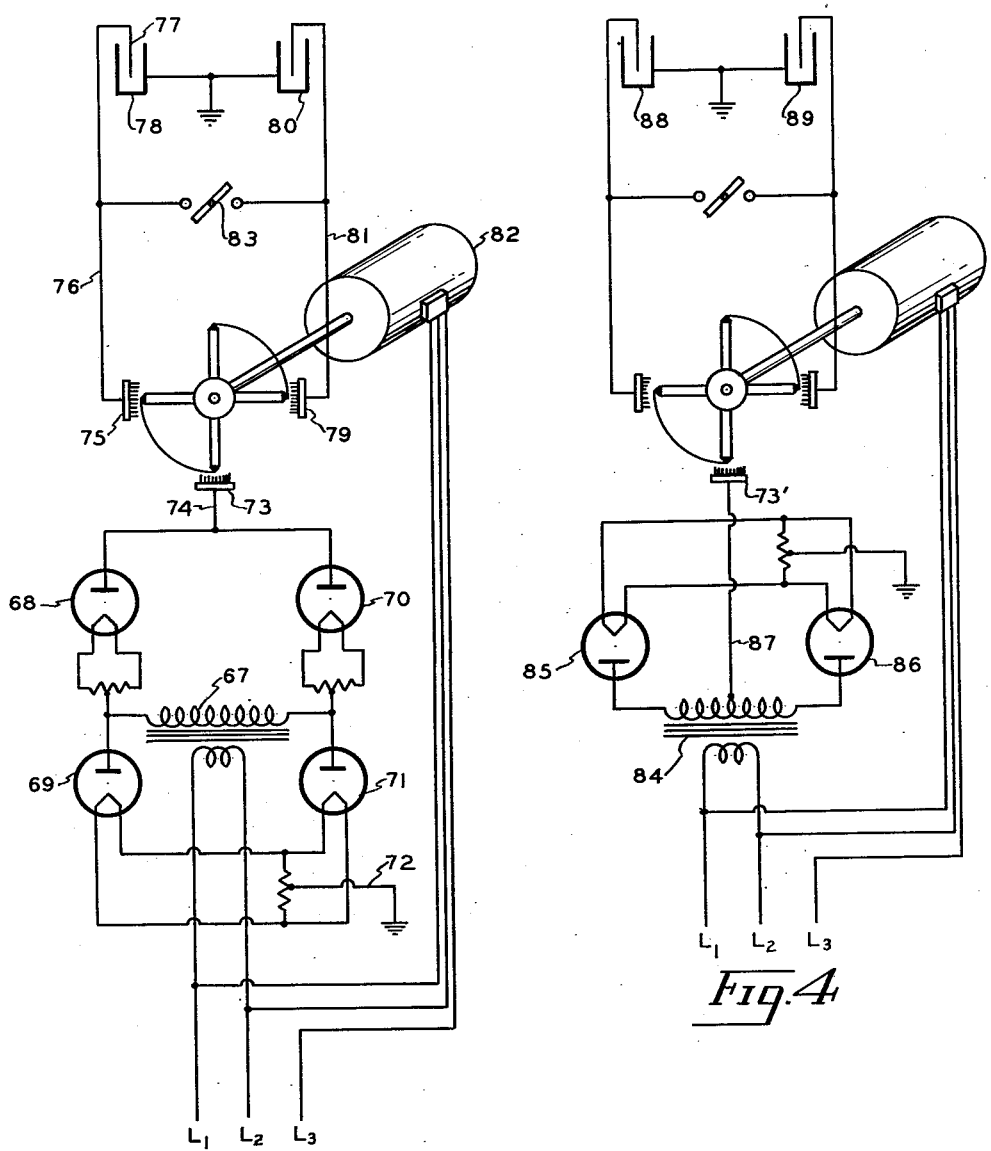

2,814,763

SWITCH AND SYSTEMS FOR UTILIZING THE SAME

Rudolf G. Streuber, West Rockport, Maine, assignor to Research Corporation, New York, N. Y., a corporation of New York Application May 18, 1951, Serial No. 227,037

4 Claims. (Cl. 315—226)

This invention relates to systems for energizing electrical precipitators and the like and more particularly to devices for rectifying alternating current including a mechanical rectifying switch. The invention also relates to an electrode shoe for a rotary mechanical rectifying switch.

An object of the invention is to provide a rectifying device that supplies rectified current having the characteristic wave form typical of such current but distinguished by discontinuities of very high frequency in such wave form. These discontinuities are provided by discrete current pulses of very short duration and interval. The rectified current provided by the systems of the invention is especially desirable for the energization of electrical precipitators of the Cottrell type because the breaks between impulses of corona discharge effected thereby permit leakage of charge from the precipitate to the collecting electrodes, thus reducing back discharge effects.

Another object is to provide a simple, relatively inexpensive and highly efficient mechanical arrangement for obtaining rectified current of the desired characteristics.

These and other objects of the invention are achieved in a device for energizing electrical precipitators and the like comprising a mechanical rectifying switch including a rotor member and a complementary stator member, one of the members having an electrode including a plurality of arcuately spaced conductive points and the other of the members having an electrode including a conductive point, the points of the members being positioned for relative arcuate motion adjacent to but spaced from each other.

The electrode shoe for a rotary mechanical rectifying switch in accordance with the invention includes a conductive base member and a plurality of arcuately spaced conductive points projecting from the base member.

The invention will be described with greater particularity and other of its objects and advantages will be pointed out in the following detailed description of the drawings, showing several exemplary forms of energizing systems or power supplies embodying the invention.

In the drawings:

Fig. 1 is a somewhat diagrammatic isometric view of one form of rectifying system;

Fig. 2 is a view similar to Fig. 1 of another such rectifying system;

Figs. 3 and 4 are diagrammatic views of rectifying systems employing vacuum tubes and embodying the invention;

Fig. 5 is a diagrammatic view showing still another form of the invention; and

Figs. 6 and 7 show still other vacuum tube modifications of systems employing the invention.

Referring to the drawings, particularly to Fig. 1 thereof, the system shown has a rectifier including a synchronous motor 10 driving shafts 11 and 12 on which are mounted rotors 13 and 14.

The rotor 13 has four radially extending arms 16, 17, 18 and 19 of insulating structural material, each such arm being provided with a pointed electrically conducting tip 16a, 17a, 18a and 19a. The tips are spaced 90° apart and are interconnected in alternate quadrants by jumper wires 20 and 21, the jumper wire 20 being connected between tips 16a and 17a and the jumper wire 21 being connected between the tips 18a and 19a.

The rotor 13 cooperates with a stator including three electrode shoes 22, 23 and 24 of identical construction. These shoes are conventionally mounted in a stator frame not shown in the diagram. The electrode shoes are mounted on 90° centers.

A description of the electrode shoe 22 will suffice for all of the shoes. This shoe has a base member 25 of electrically conductive metal and a plurality of spaced conductive pins 26 mounted on the base and projecting towards the rotor 13. The pins are of graduated length and the points or free ends 27 of the pins lie in an arc concentric with the circular path of the rotor tips but spaced somewhat therefrom.

The rotor 13 and cooperating stator shoes 22, 23 and 24 are comprised in a rotary switch designated A. This switch is generally similar to switches heretofore known but differs from known switches primarily in the construction of the electrode shoes. Such shoes are usually removably mounted in the stator frame and it is a simple matter to convert existing switches by removing the conventional shoes therefrom and substituting therefor shoes in accordance with the present invention.

Rotor 14 is comprised in a second switch designated B that includes a complementary stator having shoes 28, 29 and 30, the latter being respectively aligned in the axial direction with the shoes 22, 23 and 24 of switch A. The radial arms 30, 31, 32 and 33 of switch B are also aligned with the corresponding arms 16, 17, 18 and 19 of switch A. Switch B differs from switch A in that the jumper wires 34 and 35 are displaced 90° from the corresponding wires 20 and 21 of switch A. Wire 34 is connected between rotor tips 31a and 32a while wire 35 is connected between tips 33a and 30a.

Shoes 23 and 29 are the input shoes of the rectifier. They are connected respectively through conductors 36 and 37 to the secondary winding of a step-up power transformer 38, the primary winding of which is connected to an alternating current line $L_1$—$L_2$.

Shoes 24 and 30 are corresponding output terminals of the switches A and B. They may be grounded as shown through wires 39, 40 and 41.

Shoes 22 and 28 are opposed output terminals that are connected to the high tension side of a load, the other side of which is grounded to complete the circuit. As shown, the load consists of two electrical precipitators 42 and 43, the collecting electrodes of which are grounded through the wire 44. The discharge electrode 45 of precipitator 42 is connected to the output shoe 28 of switch B through the cable 46 and the discharge electrode 47 of precipitator 43 is similarly connected by the cable 48 to the shoe 22 of switch A.

A switch 49 is employed to interconnect the cables 46 and 48 when it is desired to operate the two precipitators as a combined load on full-wave rectified current.

The synchronous motor 10 is energized by three-phase alternating current from the line $L_1$—$L_2$—$L_3$ having the wires $L_1$ and $L_2$ in common with the wires energizing the power transformer 38. The motor 10 is designed to rotate the rotors 13 and 14 at one-half the cyclic rate of the current in lines $L_1$ and $L_2$. Thus, if the alternating current is 60 cycle, the motor rotates at 1800 R. P. M. in the direction of the arrows.

Current flow through the circuits is readily traced. In the position shown in Fig. 1, the top of the secondary winding of the transformer is at peak negative potential, Current thus flows from the bottom of the secondary through the wire 36 to the shoe 23 of switch A from the points 26 of which it jumps to the rotor tip 16a. Current then flows through the jumper wire 20 to the tip 17a from which it sparks across the air gap to the points 26 of shoe 24 and flows through wires 39 and 41 to ground. From ground, the current flows to the collecting electrodes of precipitator 42 through the ground connection 44. Corona discharge carries the current to the discharge electrode 45 and thence through the wire 46 to the shoe 28 of switch B. The current bridges the gap from the points of shoe 28 to the rotor tip 33a and thence travels through the jumper wire 35 across the gap between the tip 30a and the points of shoe 29 and through the cable 37 to the upper end of the secondary winding of transformer 38.

When the current has advanced 180° the rotors 13 and 14 will have turned 90° and the top of the secondary winding of transformer 38 will be at peak positive potential. It can readily be visualized that the jumper wire 35 interconnects shoes 29 and 30 of switch B and that jumper wire 21 interconnects shoes 22 and 23 of switch A. Under these conditions current flows from the top of the secondary winding of transformer 38 through wire 37 to the switch B and from the switch B through wires 40 and 41 to ground. From ground, the current travels through the wire 44 through the precipitator 43 and wire 48 to the switch A. From the switch A, the circuit is completed through the cable 36 to the lower end of the secondary of transformer 38.

It will thus be seen that negative potential is applied to the discharge electrodes of the precipitators 42 and 43 and that these precipitators are energized with alternate half waves of rectified current.

For most efficient operation, it is desirable that the points of the electrode shoes be so spaced and aligned with respect to each other and to the rotor tips that sparks will jump regularly between the tips and the points. Each shoe may have the same number of points evenly spaced and accurately aligned with cooperating points in other shoes.

In order to obtain the very high frequency pulses desired, it is important that a discrete spark shall jump between a rotor tip and each successive shoe point. Taking into account the voltages, the rotor speeds employed, and the particular configuration of the rotor tips and shoe points, the points are so spaced from each other and from the arc of the rotor tips that a distinct circuit break occurs as a rotor tip moves from one shoe point towards the next adjacent shoe point.

The advantages of the invention may also be realized where only one of the electrode shoes is constructed in accordance with the present invention and the other shoes are of conventional design that transmit a continuous flow of current in cooperation with a rotor tip. Thus, only the shoe 23 or 29 of the system of Fig. 1 need have the spaced points of the invention and the others may be conventional. Since the shoe 23 or 29 is substantially continuously in the energizing circuit for all phases of operation, either one may function to interrupt the current at the desired high cyclic rate. Where only one shoe constructed in accordance with this invention is employed in a rectifier, there is no problem of point alignment.

As with rotary devices of this character, the shoes and tips may be interchanged between the rotor and the stator. The shoes may be carried by the rotor element and the tips may be mounted in the stator element.

The system shown in Fig. 2 and its operation will be easily understood in the light of the description given hereinbefore. A synchronous motor 50 drives the switch rotors 51 and 52 at one-half the cyclic rate of the current to be rectified. The rotary switch C is a complete full-wave rectifying switch including the rotor 51 and complementary stator shoes 53, 54, 55 and 56 while the switch D is a distributing switch directing alternate half-waves of rectified current to the separate precipitators 57 and 58.

Alternating current from the line $L_1$—$L_2$ is impressed on the primary winding of the step-up power transformer 85'. In the position of the parts as shown in Fig. 2, the right-hand end of the secondary winding of transformer 58' is at peak negative potential. Current thus flows from the left-hand end of the secondary through the cable 59 to the input shoe 56 of switch C, through the rotor 51 to the output shoe 55 and thence by way of wire 60 to ground. The current flows from ground to the precipitator 57 through wire 61 and thence by way of wire 62 to the shoe 63 of switch D. Current then flows through the rotor 52 to the shoe 64 of switch D and by way of cable 65 to the output shoe 53 of switch C. From shoe 53, current flows through rotor 51 to input shoe 54 and is returned to the transformer secondary through cable 66.

In this phase of operation, no current is delivered to precipitator 58 because the circuit through this precipitator is open at the tip 66' of switch D.

One-half of a current cycle later, the rotors will have advanced 90° and the left-hand end of the secondary of transformer 58' is at peak negative potential. Visualizing the new positions, it is readily seen that current flows from the right-hand end of the transformer secondary through switch C to ground and is returned to the left-hand end of the transformer secondary through precipitator 58, distributing switch D, and shoes 53 and 56 of the rectifying switch C.

This cycle is repeated for each successive half-revolution of the switch rotors and full cycle of current.

Any one of the shoes 53 or 55 of switch C or 64 of switch D may be the only shoe in the system constructed in accordance with the invention; the remaining shoes may be of conventional design.

In the system of Fig. 3, rectification is accomplished by means of a vacuum tube rectifier circuit, and distribution and high frequency pulsing are provided by a cooperating rotary switch. Referring to Fig. 3, the power transformer 67 is energized with alternating current from the wires $L_1$ and $L_2$ of the three-phase line $L_1$—$L_2$—$L_3$. The rectifier circuit includes diodes 68, 69, 70 and 71 connected in a conventional bridge circuit. One end of the transformer secondary is connected between tubes 68 and 69 and the other end is connected between the tubes 70 and 71. Full wave rectified current is delivered by the rectifier to ground through wire 72 and to the input shoe 73 of the rotary switch through wire 74. The rotary switch is constructed like either of the switches A or B of Fig. 1. Output shoe 75 delivers current through wire 76 to the discharge electrode 77 of precipitator 78 and output shoe 79 similarly delivers current to the precipitator 80 through a wire 81.

A synchronous motor 82, energized from the line $L_1$—$L_2$—$L_3$, turns the rotor of the switch which distributes successive pulses of the rectified current alternately to precipitators 78 and 80. The comb-like construction of the shoes 73, 75 and 79 interrupts the current at a high frequency to provide the type of current desired.

The switch 83 may be closed to provide full wave energization for both precipitators.

The system of Fig. 4 is similar to that of Fig. 3, but differs therefrom in the particular rectifier circuit employed. A power transformer 84 is energized from the line $L_1$—$L_2$—$L_3$. The ends of the secondary winding are connected to the anodes of diodes 85 and 86, the cathodes of which are grounded. The transformer secondary has a center tap connected to the input shoe 73' of the rotary switch through a wire 87.

It will be evident that the rectifier provides full wave rectified current which is broken down into high frequency pulses and delivered to precipitators 88 and 89 by the rotary switch.

Fig. 5 discloses an arrangement similar to that of Fig. 2. In Fig. 5 the switch E is a full wave rectifier switch. The switch F is a distributing switch. From the construction of Fig. 5, it is evident that a full wave of rectified current is delivered to output shoe 90 and that the next full wave is delivered to output shoe 91.

Fig. 6 combines the diode bridge rectifier of Fig. 3 with the distribution switch of Fig. 5. It will be seen that the switch F' delivers successive full waves of rectified current alternately to the output shoes 92 and 93.

The arrangement of Fig. 7 is like that of Fig. 6 with the exception that the diode rectifier circuit is of the type employed in the system of Fig. 4. The distribution switch F" is like the switch F' of Fig. 6. Successive full waves of rectified current are delivered to the output shoes 94 and 95 with the desired high frequency pulse.

I claim:

1. In combination with the electrodes of an electrical precipitator, a source of high-voltage alternating current, a synchronous motor driven in synchronism with said alternating current, a rotary switch driven by said motor, said switch having at least two similar concentric sets of complementary rotary and stationary switch elements, each set being insulated from the other, one of the switch elements of each set comprising a shoe having a plurality of electrically connected conductive pins extending therefrom and spaced in the direction of relative movement of said complementary switch elements and terminating in an arc concentric with said rotary switch, and the other element of each set having a conducting tip movable into independent electrically conductive relation with the successive conducting pins of first one and then the other of said shoes, and leads from said source of alternating current to the rotary switch to the precipitator electrodes.

2. A mechanical make and break circuit rectifying switch including input terminals connectable to a source of alternating current, output terminals delivering unidirectional current and a commutating switch adapted to provide a plurality of high voltage unidirectional current impulses of short duration for each half cycle having at least two pairs of relatively rotatable complementary switch elements, one element of each pair of switch elements comprising a shoe, a plurality of spaced electrically conductive interconnected pins arcuately positioned on said shoe in the direction of relative movement of said elements, and the other element of each pair of switch elements having a conducting tip extending toward the pins on said shoes and movable into independent electrically conductive relation with successive extending pins of first one and then the other of said shoes.

3. The invention according to claim 2, said shoes being stationary and said other elements being concentrically rotatable.

4. In combination with an electrical precipitator, a device for energizing the precipitator from an alternating current source with major unidirectional high voltage impulses of a duration less than a half cycle of said source frequency which comprises electric circuit elements connecting the alternating current source and the precipitator, said circuit elements including current rectifying means and synchronous current interrupter means comprising a rotor member and a complementary stator member, one of said members having an electrode including a plurality of arcuately spaced electrical conductive pins and the other of said members having an electrode including a conductive tip, said pins and said tip being positioned for relative arcuate motion, whereby each major unidirectional impulse is broken into a series of minor unidirectional impulses as successive discharges occur between said arcuately spaced conductive pins, and said conductive tip.

References Cited in the file of this patent

UNITED STATES PATENTS

| | | |
|---|---|---|
| 1,112,436 | Cabot | Oct. 6, 1914 |
| 1,366,160 | Kloneck | Jan. 18, 1921 |
| 1,382,786 | Kloneck | June 28, 1921 |
| 1,934,923 | Heinrich | Nov. 14, 1933 |
| 1,974,226 | Wintermute | Sept. 18, 1934 |
| 2,101,168 | Deutsch | Dec. 7, 1937 |

FOREIGN PATENTS

| | | |
|---|---|---|
| 600,116 | France | Nov. 3, 1925 |